March 4, 1969  NOBUHISA KODAIRA  3,431,396
JACKET TYPE OF CONSTANT TEMPERATURE HEATING APPARATUS
Filed Jan. 26, 1966
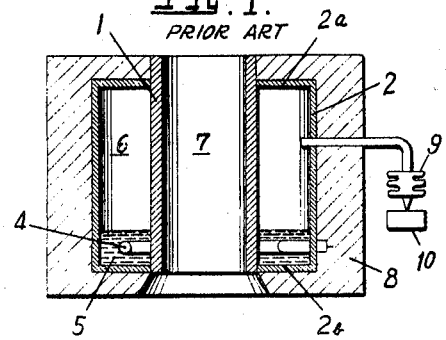
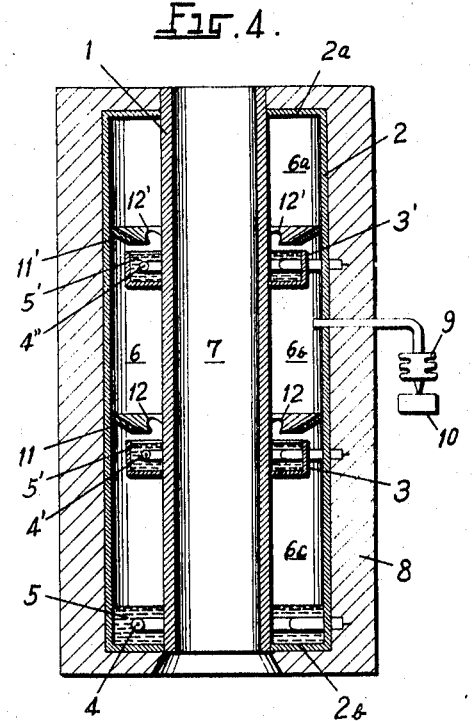
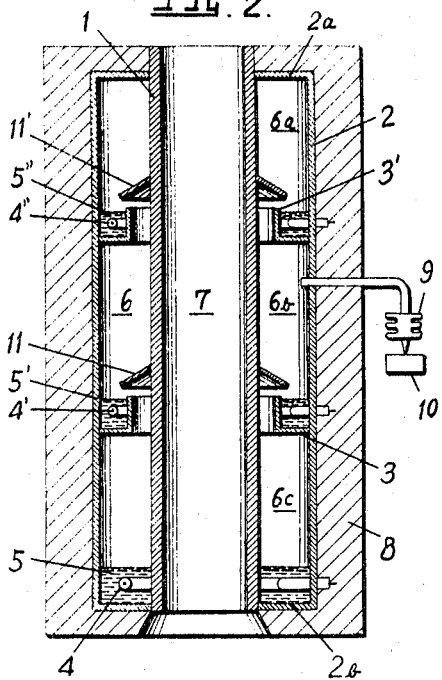
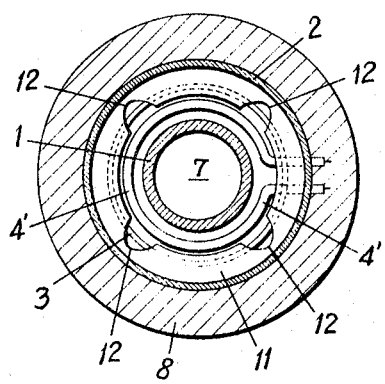
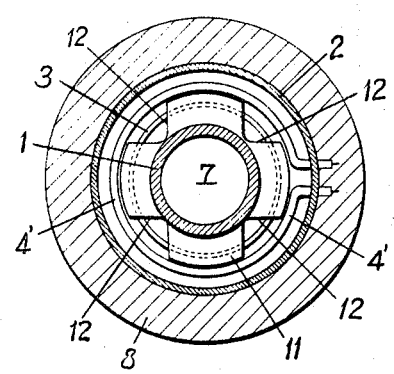
INVENTOR
*Nobuhisa Kodaira*
BY
ATTORNEY United States Patent Office 3,431,396
Patented Mar. 4, 1969

3,431,396
JACKET TYPE OF CONSTANT TEMPERATURE
HEATING APPARATUS
Nobuhisa Kodaira, 851 Kamirenjaku, Mitaka-shi,
Tokyo, Japan
Filed Jan. 26, 1966, Ser. No. 523,177
U.S. Cl. 219—326    4 Claims
Int. Cl. H05b 1/00, 11/00; F24h 7/02

ABSTRACT OF THE DISCLOSURE

Constant temperature heating apparatus has an annular sealed chamber surrounding an upright heat treating zone. Liquid thermal medium in the chamber, vaporized by a heating element at its bottom, heats said zone. To insure uniform temperature all along said zone, an upwardly opening trough having a heating element therein extends all around one of the upright chamber walls, intermediate the top and bottom thereof, to receive condensate flowing down said one wall. Condensate flowing down the other upright chamber wall is guided into the trough by a deflector thereabove on said other wall.

---

The present invention relates in general to a constant temperature heating apparatus and more particularly to a jacket type of constant temperature heating apparatus which is suitable to heat an elongated body at a constant temperature uniformly over its entire length.

In a known jacket type of constant temperature heating apparatus, a body to be heated is positioned in a central space of a heating jacket that consists of coaxial double cylindrical walls and two annular end walls defining an evacuated annular space therebetween and containing therewithin thermal medium liquid and an electric heat source immersed therein for heating the body by means of vapor of the thermal medium. The above-referred type of heating apparatus is advantageous in that the structure is simple and that a high precision of constant temperature may be obtained uniformly along its length. However, in case the body to be heated has an elongated shape, the temperature at the upper portion is relatively lowered because of the substantial cooling effect occurring while the thermal medium vapor is rising from the bottom portion where the heat source is located through the annular space to the upper portion, and especially such tendency becomes more marked when in its body to be heated has a substantial heat dissipation. Consequently, in prior devices of this type, any lengthening of the heating jacket made necessary an increase in the outer diameter so as to increase the volume of the vapor-filled space in order to eliminate or at least reduce the above-mentioned temperature gradient, and thus the prior art apparatus had a disadvantage that the apparatus was quite bulky.

Therefore, it is a principal object of the present invention to provide a jacket type of constant temperature heating apparatus, which has an outer diameter similar to that in the prior art and a jacket length several times greater than that in the prior art and yet can maintain a constant temperature uniformly along its increased length.

According to one feature of the present invention, there is provided a jacket type of constant temperature heating apparatus comprising a heat conductive inner cylindrical wall surrounding an elongated heating space therein, a heat conductive outer cylindrical wall coaxially spaced apart from said inner cylindrical wall and cooperating therewith to define an annular space, said inner and outer cylindrical walls being mounted vertically, heat conductive annular end walls for sealing the top and bottom ends of said annular space to maintain an evacuated state, at least one ring-shaped trough horizontally mounted in said annular space on one of said heat conductive cylindrical walls and radially spaced from the other cylindrical wall, at least one frusto-conical liquid guide plate having its upper peripheral edge secured to said the other cylindrical wall so that its lower peripheral edge may terminate in said annular space just above said ring-shaped trough, thermal medium liquid sealed in said evacuated annular space so as to fill said ring-shaped trough and the bottom portion of said annular space, electrical heating means located in said ring-shaped trough and at the bottom of said annular space so as to be immersed in said thermal medium liquid, and control means responsive to the vapor pressure in said annular space for switching on and off the power supply to said electric heating means.

According to another feature of the present invention, said ring-shaped trough is horizontally mounted in said annular space along said heat conductive outer cylindrical wall, and said frusto-conical liquid guide plate has its upper peripheral edge secured to said heat conductive inner cylindrical wall so that its lower peripheral edge may terminate in said annular space just above said ring-shaped trough mounted along said heat conductive outer cylindrical wall.

According to another feature of the present invention, said ring-shaped trough is horizontally mounted in said annular space along said heat conductive inner cylindrical wall, and said frusto-conical liquid guide plate has its upper peripheral edge secured to said heat conductive outer cylindrical wall so that its lower peripheral edge may terminate in said annular space just above said ring-shaped trough mounted along said heat conductive inner cylindrical wall.

According to still another feature of the present invention, said frusto-conical liquid guide plate has a plurality of notches along its lower peripheral edge which facilitate axial flow of the vapor of said thermal medium liquid through said annular space.

Upon operation of the above-featured constant temperature heating apparatus, since the sources for generating thermal medium vapor are provided at a plurality of levels along the heating jacket, the vapor generated by each of the respective vapor generating sources need only heat the corresponding section of the heating jacket along its length, even if the heating jacket has a substantial length, in order to maintain a constant temperature over the entire length of an elongated body to be heated; also the quantities of vapor generated by the respective sources communicate with each other, and consequently the vapor temperature is kept constant throughout the entire length of the heating jacket, resulting in a uniform temperature distribution along the entire length. With regard to the circulation of the thermal medium, the vapor dissipates its heat on the heat conductive inner, outer and top end walls and condenses into liquid. Then the thermal medium liquid flows down along the heat conductive inner and outer cylindrical walls and as it does so the liquid flowing down along that one of the cylindrical walls having the ring-shaped trough mounted thereon, is accumulated in the trough or in the bottom portion of the annular space, which is located just at the lower end of the cylindrical wall sections. On the other hand, the liquid flowing down along the other of the cylindrical walls, having the frusto-conical liquid guide plate secured thereto, is also guided by said guide plate into the trough which is located just at the lower end of the cylindrical wall sections, except for the lowest cylindrical wall section, in which obviously the liquid is directly guided into the bottom portion of the annular space. When the thermal medium liquid accumulated in the ring-shaped trough has completely filled the trough, it overflows and is either guided into the ring-shaped trough just below the overflowing trough by the intermediary of the corresponding liquid guide plate, or falls directly into the bottom portion of the annular space. Therefore, the electric heating means in the respective ring-shaped troughs and in the bottom portion of the annular space are always immersed in the thermal medium liquid, and serve to evaporate the thermal medium into its vapor which in turn serves to heat the heat conductive cylindrical walls while it is rising through the annular space and eventually condenses into liquid on the heat conductive cylindrical walls and the top end walls. Thanks to the above-described thermal medium circulation, uniformly distributed vapor pressure and temperature along the entire length of the elongated heating jacket is ensured.

These and other features and advantages of the present invention will become apparent upon perusal of the following specification taken in conjunction with the accompanying drawings, in which, FIG. 1 is a schematic longitudinal cross-section view of the jacket type of constant temperature heating apparatus in the prior art, FIG. 2 is a schematic longitudinal cross-section view of one embodiment of the present invention, FIG. 3 is a schematic transverse cross-section view of the embodiment of the present invention shown in FIG. 2, FIG. 4 is a schematic longitudinal cross-section view of an alternative embodiment of the present invention, and FIG. 5 is a schematic transverse cross-section view of the embodiment of the present invention shown in FIG. 4.

Referring now to FIG. 1 of the drawings, there is shown in a longitudinal cross-section a jacket type of constant temperature heating apparatus in the prior art. The heating jacket consists of a heat conductive inner cylindrical wall 1 surrounding a heating space 7 therein and a heat conductive outer cylindrical wall 2 cooperating with the inner wall 1 to define an annular space 6, a heat conductive top annular end wall 2a, and a heat conductive bottom annular end wall 2b. The heating jacket also contains thermal medium liquid 5 such as, for example, water, oils, etc. and a ring-shaped electric heater 4 immersed in the liquid at the bottom portion of the annular space 6. The annular space 6 is evacuated and contains only the vapor of the thermal medium. A pressure-sensitive bellows 9 is communicated with the annular space 6 so that it may respond to the change of the vapor pressure in the annular space 6 for actuating the electrical switch 10 so as to connect or disconnect an electrical power source (not shown) to the electric heater 4. By means of the pressure switch assembly 9, 10 the temperature is kept at a desired value. The outside of the heating jacket is surrounded by a heat insulating wall 8 having a suitable thickness. The body to be heat-treated in a uniform and constant temperature atmosphere, is positioned in the central space 7.

The above-described prior art apparatus advantageously operates to maintain a uniform and constant temperature in the central space 7 owing to the circulation of the thermal medium consisting of vaporization at the bottom, rising of the vapor, condensation on the cylindrical walls and flowing of the condensate down to the bottom along the cylindrical walls, and also owing to the intermittent heating effect by means of the bellows 9, switch 10 and electric heater 4, provided that the length of the heating jacket and the central space is not too great with respect to the diameter of the heating jacket. However, in case the length of the heating jacket is substantially large relative to its diameter and the apparatus is used to heat-treat an elongated body without substantially increasing the diameter of the heating jacket, a temperature gradient occurs between the top end and the bottom end of the annular space, and thus the uniformity of the temperature along the length of the apparatus becomes insufficient for the desired purpose.

One preferred embodiment of the novel constant temperature heating apparatus of the present invention for overcoming the above-mentioned disadvantage is shown in FIGS. 2 and 3. The constant temperature heating apparatus shown in these figures is similar to that shown in FIG. 1, except for the points that the heating jacket is about three times as long as that in FIG. 1, and that two sets of ring-shaped troughs 3, 3′ having electric heaters 4′, 4″ and thermal medium liquid 5′, 5″ contained therein, and frusto-conical liquid guide plates 11, 11′ are provided in the annular space 6 along its length. Therefore other components in this embodiment are given the same reference numerals as those used in FIG. 1, and the description about the formation and operation of these common components will be omitted.

In this embodiment, the ring-shaped troughs 3, 3′ having a rectangular cross-section are horizontally mounted in the evacuated annular space 7 along the heat conductive outer cylindrical wall 2, and on the other hand the frusto-conical liquid guide plates 11, 11′ have their upper peripheral edges secured to the heat conductive inner cylindrical wall 1 so that their lower peripheral edges may terminate in the annular space 6 just above the corresponding ring-shaped troughs 3, 3′ respectively. The two sets of ring-shaped troughs and frusto-conical liquid guide plates divide the length of the heating jacket into three sections, that is, into upper, middle and lower sections 6a, 6b, 6c having substantially equal axial lengths. The respective ring-shaped troughs 3, 3′ are provided with ring-shaped electric heaters 4′, 4″ respectively therein and the electric heaters are immersed in the thermal medium liquid 5′, 5″ respectively accumulated in these troughs. As is best seen in FIG. 3, the liquid guide plates 11 and 11′ have notches 12 respectively in their lower peripheral edges. These notches facilitate upward flow therethrough of the thermal medium vapor from the middle section 6b to the upper section 6a or from the lower section 6c to the middle section 6b.

Upon operation of the apparatus in FIGS. 2 and 3, the electric heaters 4, 4′ and 4″ are connected in parallel or in series and simultaneously supplied with electric power through the pressure-sensitive electric switch assembly 9, 10. In this case, the thermal medium vapor is generated not only from the thermal medium liquid 5 at the bottom portion, but also generated from the thermal medium liquid 5′ and 5″ in the ring-shaped troughs 3 and 3′ respectively. The thermal medium vapor dissipates its heat on the heat conductive inner and outer cylindrical walls 1 and 2, and condenses into thermal medium liquid. The thermal medium liquid condensed on the outer cylindrical wall 2 flows down along the same wall and is directly accumulated in the ring-shaped troughs 3, 3′ or in the bottom portion of the annular space 6 depending upon the sections 6a, 6b, or 6c where the vapor has condensed. On the other hand the thermal medium liquid condensed on the inner cylindrical wall 1 flows down along the same wall and is accumulated in the ring-shaped troughs 3, 3′ by the aid of the frusto-conical liquid guide plates 11, 11′ respectively, or directly in the bottom portion of the annular space 6 depending upon the sections 6a, 6b, or 6c where the vapor has condensed. Consequently, the circulation of the thermal medium is mainly confined in the respective sections of the annular space 6 divided by the two sets of the ring-shaped troughs and the frusto-conical liquid guide plates, and thus the uniformity of the temperature along one section of the annular space, which is far shorter than the entire length, is improved.

Besides the above-described local circulation of the thermal medium, the thermal medium vapor can flow upwardly from the section 6b to the section 6a or from the section 6c to the section 6b. Consequently, the thermal medium liquid 5', 5" filled in the troughs 3', 3 may possibly overflow and fall down respectively into the trough 3 by the aid of the liquid guide plate 11 and into the bottom portion of the annular space directly. These circulations of the thermal medium between the divided sections serve to ensure the uniformity of the temperature between the respective sections. Therefore, the pressure-sensitive electric switch assembly 9, 10 coupled only to the middle section 6b is sufficient for maintaining a uniform and constant temperature along the entire length of the annular space 6. Here it is to be noted that the plurality of notches 12 provided along the lower peripheral edges of the frusto-conical liquid guide plate 11 facilitate the flow of the thermal medium vapor between the respective sections 6a, 6b, 6c.

As will be seen from the above description of the operation of the apparatus, initially the thermal medium liquid need not be poured into the ring-shaped trough 3, 3' in the evacuated annular space 6 of the heating jacket, but instead the liquid is supplied so as to fill only the bottom portion of the annular space at a somewhat higher level than the level shown in FIG. 2. Then only the electric heater 4 is switched on while the other electric heaters 4' and 4" are kept disconnected. The vapor generated from the thermal medium liquid at the bottom portion flows upwardly and condenses on the inner and outer cylindrical walls in the divided sections 6a and 6b. Accordingly, the thermal medium liquid condensed on the inner and outer cylindrical walls in the respective annular space sections flows down along the cylindrical walls and is eventually accumulated in the ring-shaped troughs 3, 3' respectively either directly or by the aid of the frusto-conical liquid guide plates 11, 11'. In this way, the thermal medium liquid which was initially supplied only to the bottom portion of the annular space 6, comes to completely fill the ring-shaped troughs 3, 3' as shown in FIG. 2.

An alternative embodiment of the present invention is shown in FIGS. 4 and 5. In this embodiment, the formation and operation of the apparatus is quite similar to that shown in FIGS. 2 and 3 except for the points that the ring-shaped troughs 3, 3' are horizontally mounted in the annular space 6 along the inner cylindrical wall 1 instead of the outer cylindrical wall 2, and that the frusto-conical liquid guide plates 11, 11' have their upper peripheral edges secured to the outer cylindrical wall 2 instead of the inner cylindrical wall 1. Therefore, every component in the apparatus shown in FIGS. 4 and 5 corresponds exactly to those shown in FIGS. 2 and 3, and so they are designated by the same reference numerals as those used in FIGS. 2 and 3. The notches 12, 12' provided along the lower peripheral edges of the frusto-conical liquid guide plates 11, 11' respectively, are also provided in the liquid guide plates 11, 11' shown in FIGS. 4 and 5. The only difference in the appearance of the liquid guide plates 11, 11' exists in that in the case of the apparatus in FIGS. 2 and 3 the upper peripheral edge has a smaller diameter than the lower peripheral edge, whereas in the case of the apparatus in FIGS. 4 and 5 the upper peripheral edge has a larger diameter than the lower peripheral edge. Since the operation of the apparatus shown in FIGS. 4 and 5 is exactly the same as that of the apparatus shown in FIGS. 2 and 3, the description of the operation of the apparatus shown in FIGS. 4 and 5 will be omitted. If necessary, the preceding description with respect to the apparatus in FIGS. 2 and 3 may be applied in itself to the apparatus in FIGS. 4 and 5, since the counterpart components in these apparatuses are designated by the same reference numerals and their functions are quite the same.

As we have pointed out in the beginning of the specification, the jacket type of constant temperature heating apparatus according to the present invention as shown in FIGS. 2 through 5 has a plurality of vapor sources of thermal medium along the length of the heating jacket so that the circulation of the thermal medium may be divided into a plurality of sections, and yet the communication of the thermal medium vapor between the respective sections is allowed. Consequently, the temperature gradient along an elongated heating jacket which might be possibly caused when the vapor source at the bottom of the annular space is solely used for a relatively long heating jacket, may be eliminated, and a uniform temperature distribution along the entire length of the elongated heating jacket may be ensured. The constant value of the temperature distributed uniformly along the heating jacket may be maintained by the aid of the pressure-sensitive electric switch assembly 9, 10 for switching on and off the power supply to the electric heaters 4, 4', 4" in response to the change of the vapor pressure in the annular space 6 of the heating jacket.

While the principle of the present invention has been described above with reference to specific apparatus and its modification, it should be clearly understood that many changes and modifications could be made without departing from the spirit of the invention and all the materials contained in the specification and drawings are not intended to limit the scope of the invention.

What is claimed is:

1. Constant temperature heat treating apparatus of the type comprising an upright inner cylindrical wall defining an inner heat treating zone, an upright outer cylindrical wall cooperating with the inner cylindrical wall and with top and bottom end walls to define a chamber surrounding the heat treating zone, a quantity of heat vaporizable liquid thermal medium in said chamber, and heating means in the bottom portion of said chamber for vaporizing the thermal medium, said apparatus being characterized by:
   (A) means on one of the cylindrical walls defining an upwardly opening trough that
      (1) extends entirely around said one cylindrical wall,
      (2) is radially spaced from the other cylindrical wall, and
      (3) is axially spaced from the top and bottom walls,
   said trough being adapted to receive condensate thermal medium that flows down along said one wall, and dividing the chamber into communicated zones thereabove and therebelow; and
   (B) other heating means in said trough for vaporizing liquid thermal medium which accumulates therein.

2. The constant temperature heat treating apparatus of claim 1, further characterized by:
   deflector means on the other of the cylindrical walls, above the trough, said deflector means being inclined downwardly and radially away from said other cylindrical wall and having lower edge portions radially spaced from the first mentioned cylindrical wall and directly above the trough so that condensate thermal medium that flows down said other cylindrical wall is guided into the trough by the deflector means.

3. The constant temperature heat treating apparatus of claim 2, further characterized by:
   said deflector means
      (1) being substantially frustoconical and
      (2) having notches in its lower edge to facilitate passage of vaporized thermal medium between the respective zones above and below the trough.

4. In a jacket type of constant temperature heating apparatus comprising a pair of upright substantially co-axial cylindrical walls cooperating with annular top and bottom end walls to provide an enclosed annular chamber surrounding a heat treating zone, a quantity of heat vaporizable liquid thermal medium in said annular chamber, and heating means in the bottom of the annular chamber by which the thermal medium is vaporized:
(A) means in the chamber defining an upwardly opening annular trough secured to one of said cylindrical walls in axially spaced relation to the top and bottom end walls and extending horizontally around said one cylindrical wall to receive condensate thermal medium that flows down along the same, said trough means being radially spaced from the other cylindrical wall to permit vaporized thermal medium to flow between the portions of the chamber thereabove and therebeneath;
(B) a substantially frustoconical guide element secured to the other cylindrical wall above said trough means and extending downwardly and radially toward the first mentioned cylindrical wall with lower edge portions thereof radially spaced from the first mentioned wall and spaced above the trough to guide thereinto condensate thermal medium which flows down along said other cylindrical wall; and
(C) other heating means in said trough.

References Cited
UNITED STATES PATENTS

| | | | |
|---|---|---|---|
| 1,587,559 | 6/1926 | Shuman | 219—341 X |
| 2,820,134 | 1/1958 | Kobayashi | 219—326 |
| 3,274,373 | 9/1966 | Maddox | 219—271 |
| 3,327,772 | 6/1967 | Kodaira. | |

ANTHONY BARTIS, *Primary Examiner.*

U.S. Cl. X.R.

219—341, 271, 439; 165—105; 126—376